March 28, 1950     C. W. KELSEY     2,502,094

SELF-CLEANING TINE

Filed May 31, 1946

INVENTOR.
Cadwallader W. Kelsey
BY

ATTORNEY

Patented Mar. 28, 1950

2,502,094

UNITED STATES PATENT OFFICE 2,502,094

SELF-CLEANING TINE

Cadwallader W. Kelsey, Troy, N. Y., assignor to Rototiller Inc., Troy, N. Y., a corporation of Delaware Application May 31, 1946, Serial No. 673,590

6 Claims. (Cl. 97—216)

My invention relates to soil working tools and particularly to an improved type of tine for use on rotary soil tilling devices.

Such devices are provided with a shaft which extends transversely of the machine, generally at the rear thereof, and to which are attached a plurality of soil working tools or tines which break up the soil when the shaft is rotated. Such tines are more or less hook-like and provided with free ends or points which are the first parts of the tines to strike the ground. In other words, the points of the hooks extend forwardly in the direction in which the machine moves and, as a result thereof, grass, weeds, surface trash and the like are caught in the bight of the hook and are either carried around and around with the hook or are dropped on the surface of the tilled soil.

The principal object of my invention is to provide an improved type of tine which will function to bury grass, cover crops, trash etc., in the soil instead of pulling it out of the soil or dropping it on the surface thereof. In other words, to provide a tine of such design that, instead of hooking into trash and the like and pulling it out of the ground, it will function to depress and leave such material buried comparatively deep in the soil.

I accomplish these objects by forming my tine substantially as described below and illustrated in the accompanying drawing in which.

From a consideration of the drawings, it will be apparent that, while my tine may be described broadly as a hook-like implement, it is distinguished from the ordinary tines by its configuration and its disposition with respect to the transverse shaft to which it is attached so that the back of the hook, instead of the point or end thereof, first engages the soil. In other words, when in operation, the point or free end of the hook trails instead of precedes the other portions of the hook which engage the soil. Furthermore, the trailing portion adjacent the free end of the tine is so shaped and disposed with respect to the direction in which it revolves about the shaft axis that any material engaged by the tine tends to slip off the back of the hook instead of to be engaged in the bight thereof.

The soil engaging portion of the tine between the shank thereof and the free end is twisted or of double curvature so that it tends to break up the soil for some distance on either side of a plane extending through the shank and perpendicular to the axis of the shaft to which the tine is attached.

Figure 4:
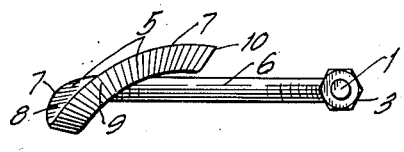
Fig. 4 is a top view.
Figures 1, 2:
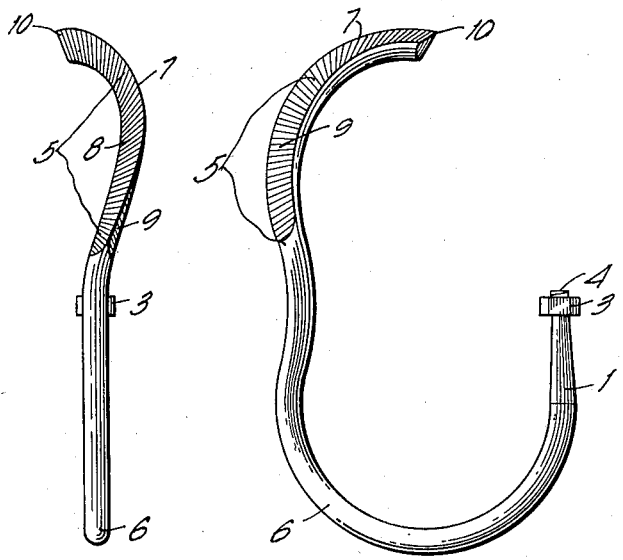
Fig. 1 is a side elevation view of the tine.
Fig. 2 is a front elevation view.
Figure 3:
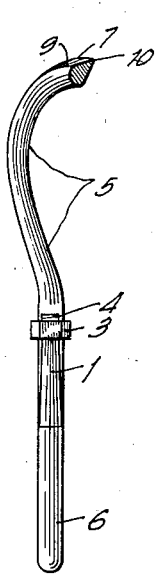
Fig. 3 is a rear elevation view.
Figure 5:
Fig. 5 is a sectional view in a plane substantially normal to the cutting edge of the tine.

As illustrated, my tine comprises a shank 1 which is preferably tapered so that it may be secured firmly in a tapered socket 2 (see Fig. 6) by means of the nut 3 which cooperates with the threaded end 4 thereof, as shown in Figs. 1, 3, 4 and 6. 5 is the soil engaging portion of the tine, and an arcuate portion 6, about 180° in length, merges with and connects the shank and the soil engaging portions of the tine together. The tine is preferably formed of round bar stock which is bent as shown and which, as it approaches the free end of the tine, is forged down to a cross-section of about the shape shown in Fig. 5 to provide a cutting edge 7 on the outside of the hook. The cutting edge 7 is a twisted line or a line of double curvature and perhaps may be best described as approximating in shape a half helix which is formed by the intersection of the approximately helicoidal surfaces 8 and 9. However, the cutting edge 7 is a half helix of variable pitch. That is to say, as viewed in Fig. 1, it will be noted that the portion of the edge 7 adjacent its junction with the round portion of the tine has a comparatively steep pitch which rapidly decreases substantially to zero at the free end 10 of the tine. The fact that the pitch of the helical cutting edge is practically zero at the free end of the tine and said edge is twisted through only about half a complete turn is very important because it permits the tine, as it leaves the ground, readily to shed any material which may have been caught and carried by the cutting edge and thus to leave any such material buried in the ground instead of raising it beyond the surface of the ground.

Figure 6:
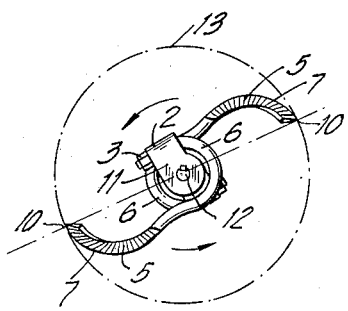
Fig. 6 is a small scale, end elevation view of a tine assembly attached to the shaft of a rotary soil tilling device.

In Fig. 6, I have shown a pair of tines mounted in holds 11 which are keyed or otherwise secured to the shaft 12. Since the shaft rotates in the direction of the arrows, it will be apparent that the cutting edges 7, which are on the fronts of the tines but on the backs of the hooks, will first strike the ground; that that portion of the cutting edge 7 which is adjacent the free end of the tine will follow or trail the other portions of the cutting edge as they pass into and through the soil; and that the free end of the tine will be the last portion to leave the ground. Thus, any trash or other material which is engaged by the tines will be pushed further into the soil and, as the tines leave the soil, it will be quite impossible, because of their shape, for them to pull any such material out of the soil.

The portions of the cutting edges adjacent the free ends of the tines are approximately tangent to or coincident with the circle or cylinder 13 which represents the locus of the free ends of the tines as they revolve about the axis of the shaft 12 when the machine is not moving over the ground. When the machine is moving ahead, the loci of the free ends of the tines are, of course, approximately cycloids, and would be perfect cycloids if the tines were rolling on a plane surface. In order clearly to understand how my weedless tine functions, it must be borne in mind that the motion of the free end of the tine as it leaves the soil is the resultant of two motion components, one of which is due to the revolving movement of the free end of the tine about the axis of the driving shaft and the other is due to the forward movement of the entire machine. Thus, while the action of the tine upon any trash material encountered thereby is to depress the material into the soil, the material is not within the hook but is engaged by the back thereof, and, as the trailing portion adjacent the free end of the tine comes out of the ground, it moves not only upwardly but also forwardly, and away from any trash that may have been carried on the back thereof during the first part of its upward movement to leave said trash buried in the soil behind the machine. Moreover, due to its shape, it will be apparent that the tine tends further to depress and then slip past all trash encountered thereby in any portion of its path through the soil.

What I claim is:

1. A soil working tool for a rotary soil tilling device comprising a straight shank portion, a soil-engaging portion, and an approximately semi-circular portion connecting said shank and soil-engaging portions; the center line of said shank and the center line of said semi-circular portion lying substantially in the same plane; the axis of said soil-engaging portion being a twisted curve approximating a half helix in form and said portion being provided on the convex side thereof with a cutting edge having portions thereof disposed on each side of said plane, with that portion of said cutting edge adjacent the free end of said tool being substantially closer to the axial line of said shank than the other portions of said cutting edges.

2. A soil working tool for a rotary soil tilling device; said tool comprising a generally G-shaped implement comprising a straight shank portion, a soil-engaging portion, and an arcuate portion curving smoothly through an arc of about 180° and connecting and merging into said shank and said soil-engaging portions; the axis of said soil-engaging portion being twisted and said portion being provided on the outside thereof with an approximately helical cutting edge having a variable pitch and turning through an arc of about 180°; the pitch of said edge being substantially zero at the free end of said tool.

3. A tine for a rotary soil working device comprising a straight shank portion for attaching said tine to a holder, and a soil-engaging portion having a cutting edge terminating at the free end of said tine; said cutting edge being curved backwardly toward the axis of said shank portion in the zone thereof adjacent said free end of said tine and approximating in configuration a helix of variable pitch; said pitch diminishing rapidly in said zone as said edge approaches said free end; whereby trash and the like encountered by said tine as it passes through the soil will readily slip past the free end of said tine and remain buried in said soil.

4. A tine for a rotary soil working device formed of round stock and comprising a straight shank for securing said tine in a holder; an approximately semi-circular portion extending from said shank portion and having its center line substantially coplanar with the axis of said shank portion; and a soil-engaging portion extending from said semi-circular portion to a free end of said tine and provided, on the side thereof remote from the axis of said shank, with an approximately helical cutting edge extending from a point adjacent said semicircular portion to said free end and formed by the intersection of two approximately helicoidal surfaces; said edge, adjacent the free end of said tine, being approximately tangent to a cylinder having its axis passing through the center of said semi-circular portion.

5. In a tool assembly for a rotary soil-working device, the combination with a rotatable, horizontal shaft, of a tool holder having a tool holding socket thereon and secured to said shaft, a soil-working tool comprising a shank secured in said socket and a soil-engaging portion connected to said shank and terminating in a free end substantially spaced from said holder and disposed to trail said soil-engaging portion when said shaft is rotated; said soil-engaging portion being provided with a twisted cutting edge approximating a half helix in shape extending forwardly from said trailing end and having that portion of said edge adjacent said trailing end approximately tangent to the interior of a cylinder coaxial with said shaft, whereby weeds, grass, and the like, encountered by said soil-working tool when in operation, instead of being pulled out of the soil thereby, will tend to slip off the trailing free end of said tool and be left buried in the soil.

6. The structure set forth in claim 5 in which said shank is connected to said soil-engaging portion by a curved portion of said tool extending partially around said holder.

CADWALLADER W. KELSEY.

REFERENCES CITED

The following references are of record in the file of this patent:

UNITED STATES PATENTS

| Number | Name | Date |
|---|---|---|
| 2,143,648 | Coutchure | Jan. 10, 1939 |

FOREIGN PATENTS

| Number | Country | Date |
|---|---|---|
| 560,581 | France | Oct. 6, 1923 |